United States Patent [19]

Wagoner

[11] Patent Number: 4,705,353

[45] Date of Patent: Nov. 10, 1987

[54] OPTICAL FIBER CABLE CONSTRUCTION

[75] Inventor: Joseph L. C. Wagoner, Houston, Tex.

[73] Assignee: Schlumberger Technology Corporation, Houston, Tex.

[21] Appl. No.: 778,279

[22] Filed: Sep. 18, 1985

Related U.S. Application Data

[63] Continuation of Ser. No. 479,779, Mar. 28, 1983, abandoned.

[51] Int. Cl.⁴ .................................................. G02B 6/44
[52] U.S. Cl. ............................................... 350/96.23
[58] Field of Search ..................................... 350/96.23

[56] References Cited

U.S. PATENT DOCUMENTS

| | | | |
|---|---|---|---|
| 4,000,936 | 1/1977 | Gloge | 350/96.23 |
| 4,331,379 | 5/1982 | Oestreich et al. | 350/96.23 |
| 4,365,865 | 12/1982 | Stiles | 350/96.23 |
| 4,392,714 | 7/1983 | Bruggendieck et al. | 350/96.23 |
| 4,432,605 | 2/1984 | Niro et al. | 350/96.23 |
| 4,464,013 | 8/1984 | Sabia | 350/96.23 |
| 4,525,702 | 6/1985 | Kitagawa et al. | 350/96.23 |

FOREIGN PATENT DOCUMENTS

| | | | |
|---|---|---|---|
| 0054407 | 5/1981 | Japan | 350/96.23 |
| 0125708 | 10/1981 | Japan | 350/96.23 |

OTHER PUBLICATIONS

"Optical Cable Design" by Schwartz et al, Bell Lab. Inc., Optical Fiber Telecommunications.

*Primary Examiner*—William L. Sikes
*Assistant Examiner*—Akm E. Ullah

[57] ABSTRACT

An optical fiber cable construction which minimizes microbending and macrobending losses by locating the fibers in a balanced and closely spaced geometric configuration proximate the cable center within a protective jacket having an annular configuration concentric with the fiber configuration and substantially occupying all space around the fibers, which jacket is formed from a material haviong a relatively high flexural modulus.

24 Claims, 2 Drawing Figures

OPTICAL FIBER CABLE CONSTRUCTION

This is a continuation of application Ser. No. 479,779, filed Mar. 28, 1983, now abandoned.

BACKGROUND OF THE INVENTION

This invention relates to a cable construction for optical fiber communication cables.

In the past few years there has been a significant effort expended attempting to develop optical fiber cables capable of efficiently transmitting optically encoded information. This is largely due to the potential ability of these optical cables to carry large amounts of information through a fiber which is substantially smaller and lighter than its electrical equivalent. The performance of these optical cables are however greatly subject to the application of exterior mechanical stress. This stress not only has the potential for destroying the optical fibers, but it can also degrade the optical transmission characteristics of the fibers. It is well known that even slight bending of the entire fiber (i.e. macrobending) or annular perturbations along the surface of the fiber (i.e. microbending) can introduce sever losses into the transmission characteristics for the fiber. A large amount of effort has therefore been expended in minimizing the amount of stress which is applied to the individual optical fibers within a fiber cable in order to minimize these losses.

For example, U.S. Pat. No. 4,235,511 describes an optical fiber cable construction in which several structural compartments are formed within the cable to house the individual optical fibers. These compartments are substantially larger than the optical fibers placed therein to ensure a loosely fitting relationship between the fiber and the compartment. As stated in the abstract of the above-referenced patent, this "loose fitting of the optical fibers overcomes the increased transmission losses and changed transmission bandwidth caused by lateral or compression forces inherently applied to the optical fibers of conventional optical fiber cable constructions".

As an alternative to this compartment design, U.S. Pat. No. 4,009,932 describes an optical fiber cable construction in which the fiber is located within an array of 3 or more metal filaments which are spaced from the optical fiber and disposed in planes intersecting with the axis of the fiber at substantially equal angles to the other. The optical fiber and the filaments surrounding the optical fiber are then embedded in a synthetic thermoplastic resin material. As is stated in column 2 beginning at line 27 ". . . in practice, the symmetrical arrangement of the three metallic filaments at planes arranged at 120° to each other or of the four metallic filaments in orthogonal planes, provides in any stress plane, at least one filament resistant to tension and two filaments resistant to compression, or two resistant to tension and one of compression, such filaments having physical characteristics which enable them to oppose the stresses and prevent deformation of the optical fiber."

Neither of these constructions are without shortcomings. Compartmentalized cable results in a bulky oversized cable which is inherently inflexible and therefore does not lend itself to easy manipulation. For many applications of optical fiber cables, this limitation is severe. Housing the optical fiber in an encapsulated matrix of discrete strength members provides a cable that is more easily manipulated, but one in which further stresses can be introduced and focused by the mere presence of the discrete strength members themselves. As is apparent from the description of this structure quoted above, a strength member in compression may be directly opposite a strength member in tension. These competing forces in the plane between the two strength members can introduce additional stresses within the encapsulating matrix that are ultimately directed upon the optical fiber contained therein.

SUMMARY OF THE PRESENT INVENTION

In view of the aforementioned shortcomings within the optical fiber cable constructions described above, the optical fiber cable of the present invention has been designed in an effort to minimize any unequal stress being transmitted to the optical fiber, and in an effort to provide a cable construction which is readily manipulated such that the optical fiber cable can be used with sheaves and pulleys as is required by many of the applications for which such cables are best suited.

The communications cable of the present invention, in its simplest embodiment, comprises one or more optical fibers which are designed for transmitting optical signals therethrough. These fibers are encapsulated within an extruded protective jacket formed from a material having a high flexural modulus. The jacket is extruded around the fibers such that it is concentric with the geometric configuration formed by the fibers and completely surrounds the optical fiber(s) in a manner eliminating all voids or interstitial space adjacent the optical fiber(s).

For added protection the protective jacket and the optical fibers encapsulated therein can be further encapsulated within cushioning means. The material forming the cushioning means is chosen such that the cushioning means are adequately soft and pliable to resiliently deform upon the application of lateral stress to the cable, thereby isolating the protective jacket encapsulated therein from such external stress. In the event that even further protection is required to protect the optical fibers from the elements making up the environment in which such a cable might be beneficially used, the cable can also be armored exterior to the cushioning means, with the cushioning means occupying the space between the armoring and the protective jacket.

As will be apparent from the detailed description which follows, this cable construction effectively tends to isolate the optical fibers from any of the unbalanced stresses which are applied on the cable.

BRIEF DESCRIPTION OF THE DRAWING

The present invention will be further described hereinafter with reference to the accompanying drawing wherein.

DETAILED DESCRIPTION

Figure 1:
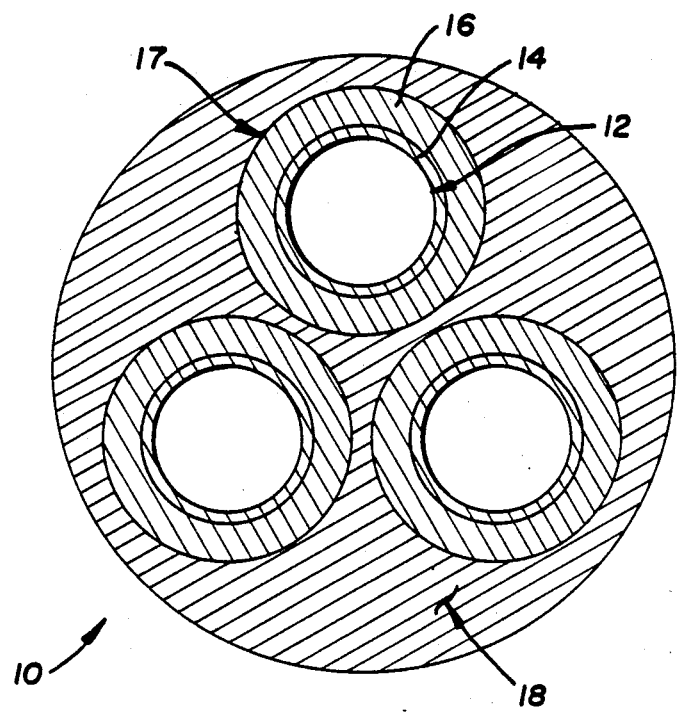
FIG. 1 is a transverse sectional view of an optical fiber cable according to the present invention.

A communications cable 10, according to the present invention is illustrated in FIG. 1. The cable 10 shown therein includes one or more optical fibers 12 which are designed for transmitting optical energy in the form of optically encoded information or signals therethrough. These optical fibers 12 are typical of those which are presently commercially available from a variety of sources.

During the fiber manufacturing process such fibers 12 are typically coated with a low modulus elastomer 14 such as RTV silicone, or the like, such that the low modulus elastomer 14 surrounds and is in substantially continuous contact with the exterior of the fiber 12. This low modulus elastomer 14 is sufficiently pliable to protect the fiber 12 from the introduction of stree due to contact by the fiber 12 with any surface imperfections within the fiber processing equipment or as a result of invading dust particles or other contaminants present within the manufacturing process. The low modulus elastomer 14 can be applied to the optical fiber 12 by a variety of means, such as pulling the fiber 12 through a pool of liquid RTV. The elastomer 14 is then typically cured by heating it with an in-line furnace. A thin protective layer 16 is then extruded around the fiber 12 and the low modulus elastomer 14, such that the protective layer 16 is in substantially continuous contact with the low modulus elastomer 14. This protective layer 16 provides longitudinal stiffness to the fiber 12, thereby tending to protect the fiber 12 from any bending stress which results from the remainder of the manufacturing process. The protective layer 16 is formed from a higher modulus material such as nylon, teflon, hytrel, or the like. The layer 16 and the low modulus material 14 are chosen to be chemically compatible, such that no interbonding or chemical degradation occurs as a result of their interaction. The fiber 12 with the low modulus material 14 and the protective layer 16 thereon is generally referred to as a buffered fiber 17. An example of such a buffered fiber 17 is as follows: an RTV silicone such as Dow Corning Sylgard 184 is applied to a fiber 12 having a typical outside diameter of 125 microns. The coated silicone fiber has a typical outer diameter of 250 microns. The RTV coated fiber is then further coated with a teflon PFA, such as that available from Dupont. The teflon coated fiber has a typical outer diameter of 500 microns.

FIG. 1 shows three of these buffered fibers 17 oriented in a centrally located geometric configuration within the cable 10. The number of fibers 17 utilized is dependent upon the amount of information which needs to be transmitted through the cable 10 and in no way should the number of fibers shown in the figures or described herein be considered a limitation on the present invention.

The cable 10 illustrated in FIG. 1 also includes a protective jacket 18 which is extruded around the geometric configuration formed by the buffered fibers 17. This protective jacket 18 substantially occupies all the interstitial space between and around the individual buffered fibers 17. The material forming the protective jacket 18 is chosen to have a high flexural modulus of elasticity typically greater than $1 \times 10^5$ psi at 72° F. This value of modulus provides a stiffness to the cable 10 that further minimizes the stress applied to the buffered fibers 17 as a result of bending. In the preferred embodiment the protective jacket 18 is formed from a flurocarbon, known as Tefzel ETFE, which is commercially available from Dupont. The material forming the jacket 18 is chosen to have a melt temperature which does not damage or cause bonding with the outer buffer 16 of the fiber 12 during the extrusion process. Standard extruding techniques are used to incorporate the fibers 12 within the protective jacket 18. Care, however, is taken during the extrusion process to minimize the lay angle of the fibers 12 with respect to the longitudinal axis of the cable 10 in order to avoid transmission losses due to macrobending. This lay angle is less than 30° and preferably very close to 0°. Care is also taken to ensure that the fibers 17 as encapsulated within the protective jacket 18 are in a balanced geometric configuration with respect to the axis of the cable 10. The buffered fibers 17 are also as close to the axis as is possible while still maintaining a separation between the buffered fibers 17 within the protective jacket 18.

Figure 2:
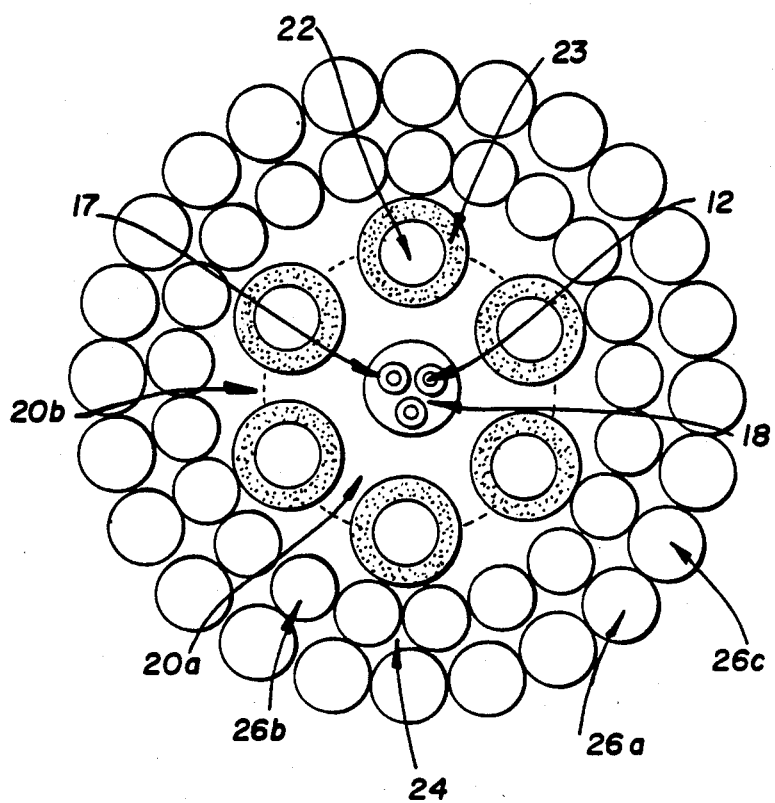
FIG. 2 is a transverse sectional view of a second embodiment of the present invention.

The cable 10 as thus far described offers substantial protection to the fibers 12 for a large percentage of the applications in which the cable 10 can be applied. It is however often desirable to add further protection to the cable 10 to allow the cables to operate under conditions of ever higher pressure and temperature. For example, cushioning means 20 can be added around the protective jacket 18. The material forming the cushion means 20 (See FIG. 2) is chosen to be readily extrudable with standard extrusion techniques, and such that it is soft enough when cured to protect the buffered fiber 17 from laterally applied stress. As a typical example, the cushioning means can be formulated from neoprene. Neoprene also has the advantage that it can be formulated to be slightly semi-conductive. This is particularly important when the presence of electrical conductors 22 is desired within the cable in addition to the fiber optic means 17. Such conductors 22 are illustrated in FIG. 2. In the preferred embodiment the conductors 22 are made of copper wire having a sufficient diameter for the current carrying capacity required by the particular application. The conductors 22 are typically insulated from the semi-conductive neoprene cushioning means 20 by a teflon outer insulation 23. In order to avoid a breaking or kinking of the conductors 22 as a result of varying tensile stress on the cable 10, the conductors are typically helically wound around the protective jecket 18. This wrapping of the conductors 22 is done with cable-making techniques such as are described in U.S. Pat. No. 3,106,815, which description is incorporated herein by reference. Typically a first layer 20a of neoprene is extruded over the protective jacket 18 prior to wrapping the conductors 22 around the jacket 18. This layer 20a of neoprene protects the buffered fibers 17 from the application of lateral stress during the wrapping of the conductors 22. The neoprene layer 20a also partially extrudes between the various wraps of the conductors 22 as these conductors 22 are being wrapped around and forced into the neoprene layer 20a. Since neoprene can be made semi-conductive as has already been discussed, it provides electrical shielding between the conductors 22 and thus reduces the effect of conductor cross-talk. A second layer 20b of neoprene is then extruded over the conductors 22, and the cable 10 is then heat cured such that this outer layer 20b of neoprene reaches a hardness in the range of from 73 to 77 Shore A. The typical outer diameter of the outer neoprene layer 20b is approximately 0.75 cm. With this hardness and thickness and neoprene provides a further cushion for the fiber 12 from the application of lateral stress.

Finally it is often desirable to armor the cable 10. The armoring 24 not only adds to the breaking strength of the cable 10 but it provides further protection for the fiber 12 against lateral stress. The armoring 24 has an annular configuration in cross-section and typically comprises one or more strands 26a, b, c, etc. of a material having a breaking strain of less than 3%, which strands are formed into an annular helix (i.e., contrahelical armors or braids) surrounding the buffered fibers 17, protective material 18, and the cushioning means 20. The technique of forming these strands into a helix is similar to that set forth in U.S. Pat. No. 3,106,815, the content of which has already been incorporated herein by reference.

This configuration for the armoring 24 has the effect of translating any tensile stress applied on the cable 10 into radial compression of the annulus. This compression as well as the compression due to any other unbalanced radial forces is transferred to the high modulus protective jacket 18. Since the optical fibers 12 are centrally located proximate to the longitudinal axis of the cable 10 and in a geometrically balanced configuration within the high modulus protective jacket 18, the effect of these unbalanced radial forces is minimized. Since the protective jacket 18 also fills the voids and interstitial spaces within the cable 10, the cable 10 is made more incompressible thus further limiting the strain which is applied on the fibers 12 or the buffered fibers 17.

In the embodiment shown the armoring 24 includes two layers of strands. This is to provide some torque balance and to ensure that the armoring 24 substantially resists compression and thus further protects against any transmission losses due to macrobending or microbending. Typically the inner layer of such a dual layer armoring 24 is formed with an armor wire that has a slightly smaller diameter than the outer armor wire. This construction is again discussed in U.S. Pat. No. 3,106,815.

Having thus described the present invention, it will be understood that changes may be made in the size, shape or configuration of some of the parts described herein without departing from the present invention as recited in the appended claims.

We claim:

1. A communications cable comprising:
   an optical fiber for transmitting optical signals therethrough;
   a first layer of cushioning material surrounding said fiber;
   a first layer of protective material surrounding said first cushioning layer for imparting longitudinal stiffness thereto;
   a protective jacket surrounding said first protective layer and in substantially continuous contact therewith, formed of a material and in a thickness selected to impart further longitudinal stiffness to the fiber;
   a layer of armor strands formed into helixes surrounding said protective jacket; and
   centering means between the outer surface of said jacket and said layer of armor for maintaining said fiber axially centered within the cable while cushioning the fiber against bending stress.

2. The communications cable of claim 1 wherein the cross-section of said cable is substantially circular.

3. The communications cable of claim 1 further comprising:
   a plurality of elongated electrical conductors located within said cushioning means in a balanced geometric configuration that is substantially concentric with said fiber.

4. The communications cable of claim 1 further comprising at least one additional optical fiber located within said protective jacket, said additional fiber being successively surrounded by a layer of cushioning material and a layer of protective material, said layer of protective material having a flexural modulus of elasticity greater than that of said layer of cushioning material and at most equal to that of said protective jacket.

5. A communications cable comprising
   an optical fiber for transmitting optical signals therethrough;
   a first layer of cushioning material surrounding said fiber;
   a first layer of protective material surrounding said first cushioning layer for imparting longitudinal stiffness thereto;
   a protective jacket surrounding said first protective layer and in substantially continuous contact therewith, formed of a material and in a thickness selected to impart further longitudinal stiffness to the fiber;
   a layer of armor strands formed into helixes surrounding said protective jacket;
   centering means between the outer surface of said jacket and said layer of armor for maintaining said fiber axially centered within the cable while cushioning the fiber against bending stress; and
   at least one additional optical fiber located within said protective jacket, said additional fiber being successively surrounded by a layer of cushioning material and a layer of protective material, said layer of protective material having a flexural modulus of elasticity greater than that of said layer of cushioning material and at most equal to that of said protective jacket;
   said optical fibers being positioned in a substantially balanced and closely spaced geometric configuration that is substantially concentric with said layer of armor wires.

6. A communications cable comprising:
   an optical fiber for transmittting optical signals therethrough;
   a first layer of cushioning material surrounding said fiber;
   a first layer of protective material surrounding said first cushioning layer for imparting longitudinal stiffness thereto;
   a protective jacket surrounding said first protective layer and in substantially continuous contact therewith, formed of a material and in a thickness selected to impart further longitudinal stiffness to the fiber;
   a layer of armor strands formed into helixes surrounding said protective jacket; and
   centering means between the outer surface of said jacket and said layer of armor for maintaining said fiber axially centered within the cable while cushioning the fiber against bending stress, said centering means comprising a material having a hardness when cured of less than 80 Shore A.

7. A communications cable comprising:
   an optical fiber for transmitting optical signals therethrough;
   a first layer of cushioning material surrounding said fiber;
   a first layer of protective material surrounding said first cushioning layer for imparting longitudinal stiffness thereto;
   a protective jacket surrounding said first protective layer and in substantially continuous contact therewith, formed of a material and in a thickness selected to impart further longitudinal stiffness to the fiber;

a layer of armor strands formed into helixes surrounding said protective jacket;

centering means between the outer surface of said jacket and said layer of armor for maintaining said fiber axially centered within the cable while cushioning the fiber against bending stress;

at least one additional optical fiber located within said protective jacket, said additional fiber being successively surrounded by a layer of cushioning material and a layer of protective material, said layer of protective material having a flexural modulus of elasticity greater than that of said layer of cushioning material and at most equal to that of said protective jacket; and a plurality of elongated electrical conductors located within said centering means in a balanced geometric configuration that is substantially concentric with said fiber.

8. A communications cable comprising:
an optical fiber for transmitting optical signals therethrough;

a first layer of cushioning material surrounding said fiber;

a first layer of protective material surrounding said first cushioning layer for imparting longitudinal stiffness thereto;

a protective jacket surrounding said first protective layer and in substantially continuous contact therewith, formed of a material and in a thickness selected to impart further longitudinal stiffness to the fiber;

a layer of armor strands formed into helixes surrounding said protective jacket; and centering means between the outer surface of said jacket and said layer of armor for maintaining said fiber axially centered within the cable while cushioning the fiber against bending stress.

said centering means comprising a first layer of an extrudable material in substantially continuous contact with said protective jacket and a second layer of an extrudable material over said first layer, said second layer having a hardness after curing in the range of from 70 to 80 Shore A.

9. The communications cable of claim 8 further comprising:
a plurality of elongated electrical conductors located within said centering means in a balanced geometric configuration that is substantially concentric with said fiber.

10. A communications cable as claimed in claim 9 wherein said conductors are positioned between said first and second layer of said cushioning means and at least partially embedded within said first layer of said centering means.

11. The communications cable of claim 10 wherein said material forming said first layer of said centering means is semi-conductive so as to afford an electrical shielding of said conductor means.

12. A low loss cable of circular cross-section for conveying optical energy therethrough comprising:
optical fiber means having at least one elongated waveguide for transmitting optical energy therethrough, said waveguide being positioned in a closely spaced geometric configuration with respect to the longitudinal axis of the cable;

a protective jacket surrounding and substantially concentric with said fiber means, said jacket being formed in a thickness and from a material having a flexural modulus of elasticity chosen to impart longitudinal stiffness to said waveguide;

first layer means surrounding and in substantially continuous contact with said protective jacket for cushioning said protective jacket;

a plurality of electrical conductors overlaying the outer periphery of said first layer means;

second layer means overlaying said plurality of conductors for further cushioning said protective jacket; and means for armoring the cable including a strand of a material formed into a helixe surrounding and in substantially continuous contact with said second layer means.

13. The cable of claim 12 further comprising:
buffering means for protecting said waveguide including a low modulus material surrounding and in substantially continuous contact with said waveguide and a higher modulus outer cladding surrounding and in substantially continuous contact with said low modulus material to impart additional longitudinal stiffness thereto.

14. The cable of claim 12, wherein said plurality of conductors are located over said first layer means in a balanced geometric configuration that is substantially concentric with the axis of said cable.

15. The cable of claim 12 wherein said material forming said protective jacket has a flexural modulus of elasticity of at least $1 \times 10^5$ psi at 72° F.

16. The cable of claim 12 wherein said second layer means comprises a material having a hardness after curing of less tha 80 Shore A.

17. The cable of claim 12 wherein said armoring means comprises a plurality strands of a material having a breaking strain of less than 3%.

18. The cable of claim 12 further comprising an additional elongated waveguide supported within said protective jacket and wherein each of said waveguides has a lay angle of less than 30° with respect to said longitudinal axis of the cable.

19. An optical fiber cable comprising:
an optical fiber waveguide placed along the axis of the cable;

a first cushioning layer of low modulas material surrounding the fiber waveguide;

a second cushioning layer of a higher modulus material than the material of said first layer surrounding said first layer for imparting longitudinal stiffness to said fiber waveguide; and a third cushioning layer, surrounding and in substantial contact with said second layer, formed in a thickness and from a material having a flexural modulus of elasticity chosen to impart further longitudinal stiffness to said fiber waveguide.

20. The optical fiber cable of claim 19 wherein said third cushioning layer is formed of a material having a flexural modulus of elasticity of at least $1 \times 10^5$ psi at 72° F.

21. The optical fiber cable of claim 19 further comprising:
a fourth cushioning layer surrounding said third cushioning layer and formed from a material having a hardness when cured to less than 80 shore A; and a layer of high tensil strength armor strands surrounding said fourth cushioning layer.

22. A low loss cable of circular cross-section for conveying optical energy therethrough comprising:

a waveguide for transmitting optical energy therethrough, said waveguide being positioned along the cable axis;

buffering means for protecting said waveguide including a low modulus material surrounding and in substantially continuous contact with said waveguide;

a higher modulus outer cladding surrounding and in substantially continuous contact with said low modulus material for imparting longitudinal stiffness to said waveguide;

a protective jacket of circular cross-section in which said cladded waveguide is embeded said jacket being substantially concentric with said cable axis and being formed in a cross-section and from a material having a flexural modulus of elasticity chosen to impart further longitudinal stiffness to said waveguide;

first means surrounding and in substantially continuous contact with said jacket for cushioning said jacket;

a plurality of elongated electrical conductors located on the periphery of said first cushioning means in the direction of elongation of the cable and, in a balanced geometric configuration that is substantially concentric with said cable axis;

second means surrounding said plurality of conductors for further cushioning said protective jacket; and means for armoring the cable including strands of a high tensil strength material formed into helixes surrounding and in substantially continuous contact with said second cushioning means.

23. The cable of claim 22 wherein said jacket is formed of a material having a flexural modulus of elasticity of at least $1 \times 10^5$ psi at 72° F.

24. The cable of claim 22 wherein said second cushioning means is formed of a material having a hardness when cured of less than 80 shore A.

* * * * *